United States Patent
Degueurce et al.

(10) Patent No.: US 10,604,166 B2
(45) Date of Patent: Mar. 31, 2020

(54) BEARING FOR MOUNTING AN ANTI-ROLL BAR ON A BOGIE FRAME, AND CORRESPONDING BOGIE

(71) Applicant: Alstom Transport Technologies, Saint-Ouen (FR)

(72) Inventors: Serge Degueurce, Le Breuil (FR); Julien Perreaut, Le Creusot (FR); Adalbert Muzyczka, Ecuisses (FR)

(73) Assignee: Alstom Transport Technologies, Saint-Ouen (FR)

( * ) Notice: Subject to any disclaimer, the term of this patent is extended or adjusted under 35 U.S.C. 154(b) by 252 days.

(21) Appl. No.: 15/587,616

(22) Filed: May 5, 2017

(65) Prior Publication Data

US 2017/0334466 A1 Nov. 23, 2017

(30) Foreign Application Priority Data

May 10, 2016 (FR) ...................................... 16 54158

(51) Int. Cl.
*B61F 5/24* (2006.01)
*F16C 35/00* (2006.01)
*B61F 3/00* (2006.01)

(52) U.S. Cl.
CPC ................. *B61F 5/24* (2013.01); *B61F 3/00* (2013.01); *F16C 35/00* (2013.01)

(58) Field of Classification Search
CPC ...... B61F 5/00; B61F 5/02; B61F 5/04; B61F 5/14; B61F 5/26; B61F 5/28; B61F 5/38
See application file for complete search history.

(56) References Cited

FOREIGN PATENT DOCUMENTS

| EP | 0918008 A1 | 5/1999 | | |
|---|---|---|---|---|
| KR | 20110010899 A | 2/2011 | | |
| KR | 20110069210 A | 6/2011 | | |
| KR | 10-2011-0010899 | * | 8/2011 | ................ B61F 5/02 |
| WO | 2004/091992 A1 | 10/2004 | | |
| WO | 2014/177417 A1 | 11/2014 | | |
| WO | 2015/166618 A1 | 11/2015 | | |

OTHER PUBLICATIONS

French Search Report dated Jan. 18, 2017, issued in corresponding French Application No. 1654158.

* cited by examiner

*Primary Examiner* — Robert J McCarry, Jr.
(74) *Attorney, Agent, or Firm* — Troutman Sanders LLP

(57) ABSTRACT

A bearing for mounting an anti-roll bar on a bogie frame, the anti-roll bar extending along an axis transverse to the bogie and being mobile in rotation relatively to the frame around the axis, the bearing including a first half-shell, and a second half-shell adapted so as to be attached on the first half-shell by means of a first attachment system, the first half-shell and the second half-shell then forming a housing crossing through along the axis and adapted for receiving the anti-roll bar. The first half-shell is distinct from the frame and adapted so as to be attached on the frame by means of a second attachment system.

8 Claims, 1 Drawing Sheet

US 10,604,166 B2

BEARING FOR MOUNTING AN ANTI-ROLL BAR ON A BOGIE FRAME, AND CORRESPONDING BOGIE

CROSS-REFERENCE TO RELATED APPLICATION

This application is based upon and claims the benefit of priority of the prior French Patent Application No. 16 54158, filed on May 10, 2016, the entire contents of which are incorporated herein by reference.

FIELD OF THE INVENTION

The present invention relates to a bearing for mounting an anti-roll bar on a bogie frame, the anti-roll bar extending along a transverse axis of the bogie and being moveable in rotation relatively to the frame around the axis, the bearing including a first half-shell intended to be mechanically secured to the frame, and a second half-shell adapted so as to be attached on the first half-shell by means of an attachment system, the first half-shell and the second half-shell then forming a housing crossing through along the axis and adapted for receiving the anti-roll bar.

The invention also relates to a bogie integrating at least two bearings as described above.

BACKGROUND

The use of at least one anti-roll bar is known in a railway vehicle bogie, extending transversely for limiting the roll of the railway vehicle at the relevant bogie level.

The anti-roll bar is generally attached to the frame of the bogie by means of two bearings. Each of the bearings comprises a first machined portion in the frame, therefore made in the material with the frame, and a second portion intended to be attached on the first portion, the anti-roll bar being confined between the first portion and the second portion.

The first portion forms a half-shell which is rather difficult to machine, and for which the manufacturing therefore takes a certain time. The result of this is a relatively high manufacturing cost of each mounting bearing, and therefore of the actual bogie.

SUMMARY

An object of the invention is therefore to overcome totally or partly the aforementioned drawback, i.e. reduce the costs relating to the mounting of the anti-roll bar on the bogie frame.

For this purpose, the object of the invention is a bearing for mounting of the type described above, wherein the first half-shell is distinct from the frame and adapted so as to be attached on the frame by means of a second attachment system.

According to particular embodiments, the bearing comprises one or several of the following features, taken according to all the technically possible combinations:

the second attachment system comprises attachment screws crossing the first half-shell and intended to be screwed into the frame;
the first half-shell and the second half-shell are structurally analogue with each other;
the first attachment system and the second attachment system coincide and are formed with attachment screws crossing the first half-shells and the second half-shell;
the first half-shell and the second half-shell are positioned symmetrically relatively to the middle plane of the bearing, the middle plane passing through the axis;
each of the first half-shell and of the second half-shell comprises a central portion forming a hemicylindrical cradle, and two attachment tabs located on either side of the central portion along a direction substantially perpendicular to the axis, each attachment tab including at least a pierced hole provided for the first attachment system and/or the second attachment system;
the attachment tabs of the first half-shell respectively include two supporting faces intended to respectively press on two protrusions of the frame; and
the first attachment system and the second attachment system are respectively formed by two pairs of attachment screws, the pairs being respectively attached in the attachment tabs.

The object of the invention is also a bogie comprising:
a frame,
at least two bearings as described above, and
at least one anti-roll bar received in housings formed by both bearings.

According to a particular embodiment, the frame includes at least four protrusions, each of the first half-shells being attached on two of the protrusions.

BRIEF DESCRIPTION OF THE DRAWINGS

The invention will be better understood upon reading the description which follows, exclusively given as example and made with reference to the appended drawings, wherein.

DETAILED DESCRIPTION

Figure 1:
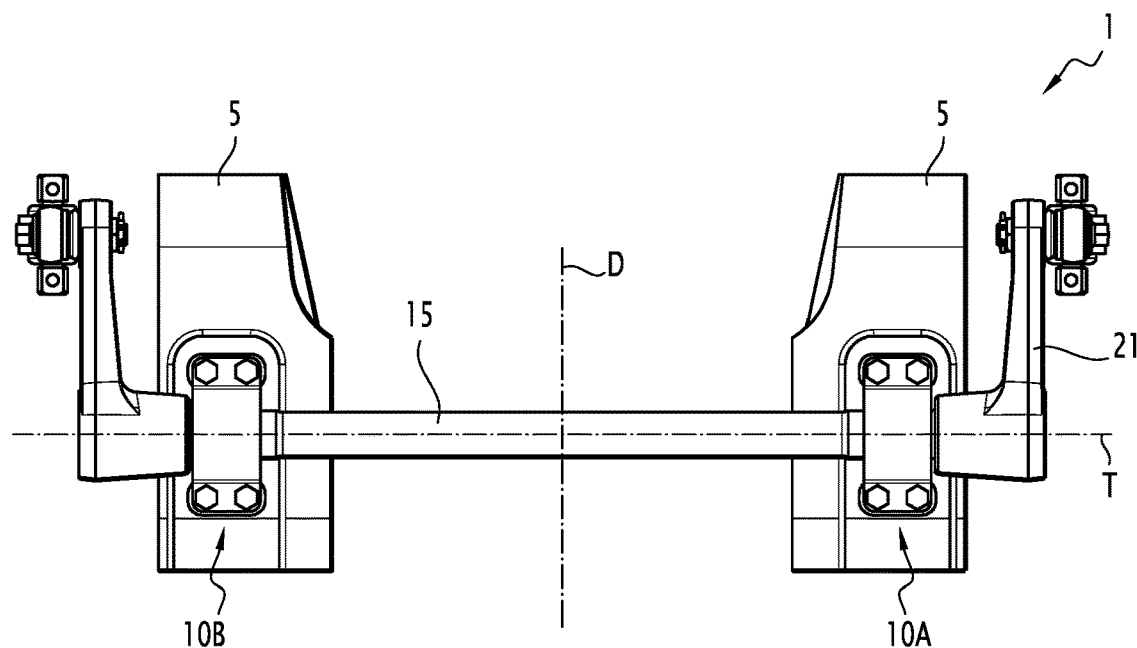
FIG. 1 is a partial view of a bogie according to the invention.
Figure 2:
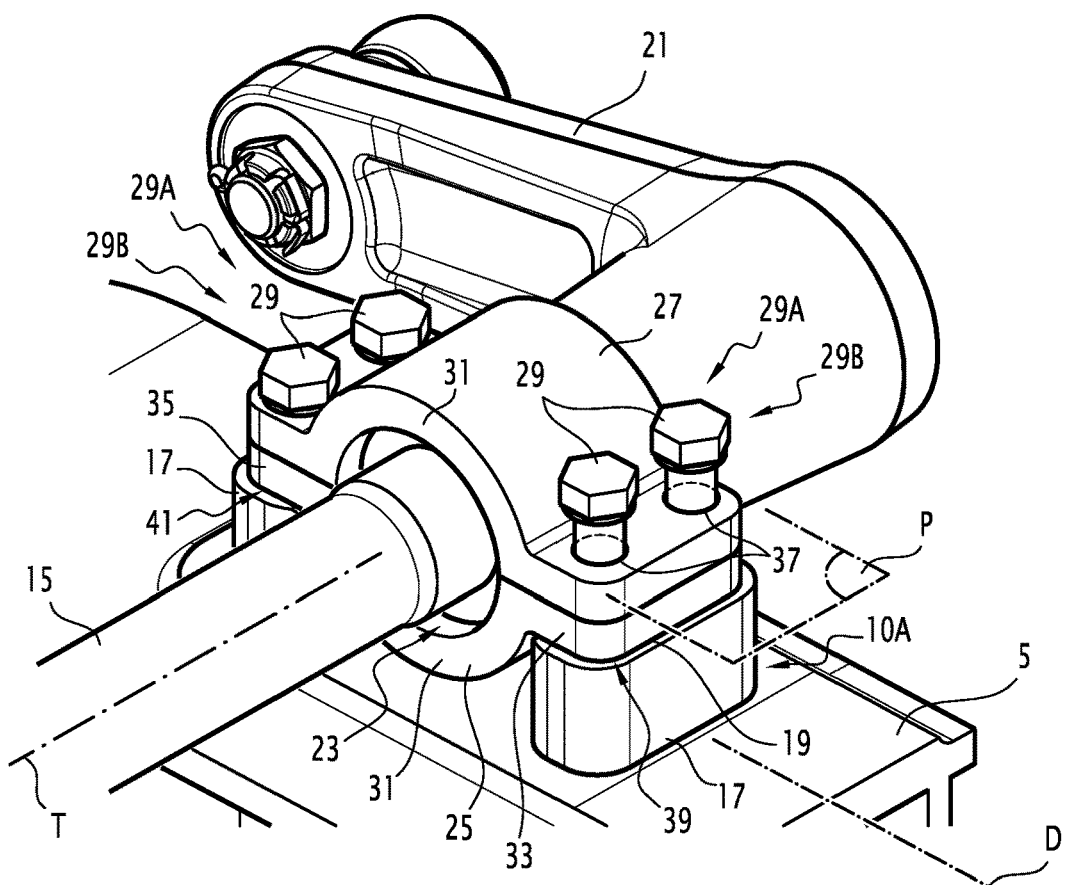
FIG. 2 is a perspective view of one of the bearings and of the anti-roll bar illustrated in FIG. 1.

With reference to FIGS. 1 and 2, a bogie 1 according to the invention is described. The bogie 1 is intended to be part of a railway vehicle (not shown).

The bogie 1 comprises a frame 5 partly illustrated in FIG. 1, at least two bearings 10A and 10B, and at least an anti-roll bar 15 received in both bearings.

The frame 5 includes at least four protrusions 17, two of which are visible in FIG. 2, the two other ones being analogue to the illustrated both protrusions.

The protrusions 17 illustrated in FIG. 2 are adapted for attachment of the bearing 10A. The protrusions 17 are machined in the frame 5 and advantageously have a simple shape to be machined, for example without any recessed portion.

Each protrusion 17 includes a face 19 adapted for cooperating with one of the bearings 10A, 10B.

Both protrusions 17 not shown in FIG. 2 are adapted for the attachment of the bearing 10B.

The anti-roll bar 15 extends along an axis T substantially transverse relatively to the bogie 1. The anti-roll bar 15 is mobile in rotation relatively to the frame 5 around the axis T because of the roll. In the example, the anti-roll bar 15 is connected to arms 21 at both of its transverse ends.

The bearings 10A, 10B are advantageously analogue with each other, also only the bearing 10A, better visible in FIG. 2, will be described hereafter.

The bearing 10A forms a housing 23 crossing through along the axis T and adapted for receiving the anti-roll bar 15. The bearing 10A comprises a first half-shell 25 adapted so as to be attached on the frame 5, a second half-shell 27 adapted so as to be attached on the first half-shell. The bearing 10A also comprises a first attachment system 29A for attaching the second half-shell 27 on the first half-shell 25, and a second attachment system 29B for attaching the first half-shell on the frame 5.

The first attachment system 29A and the second attachment system 29B advantageously coincide, and are formed with attachment screws 29.

The first half-shell 25 and the second half-shell 27 are advantageously analogue with each other and symmetrically positioned relatively to a middle plane P of the bearing 10A.

The middle plane P is for example parallel to the axis T and to the faces 19 of the protrusions 17. Advantageously, the middle plane P contains the axis T.

The attachment screws 29 are for example four in number. The attachment screws 29 cross the second half-shell 27, and then the first half-shell 25 and are screwed into the protrusions 17 of the frame 5.

Only the first half-shell 25 will be described in detail hereafter.

The first half-shell 25 comprises a central portion 31 forming a hemicylindrical cradle, and two attachment tabs 33, 35 located on either side of the central portion along a direction D substantially perpendicular to the axis T.

The direction D is for example parallel to the middle plane P.

Each attachment tab 33, 35 includes two pierced holes 37 adapted for receiving the attachment screws 29.

Both attachment tabs 33, 35 extend in the extension of each other along the direction D.

The attachment tabs 33, 35 of the first half-shell 25 respectively include two supporting faces 39, 41 respectively pressing on the faces 19 of the protrusions 17.

The supporting faces 39, 41 are substantially parallel to the middle plane P.

The pierced holes 37 are for example made perpendicularly to the middle plane P.

The mounting of the anti-roll bar 15 on the frame 5 of the bogie 1 will now be described.

The four protrusions 17 are machined beforehand in the frame 5.

Next, the first half-shells 25 of the bearings 10A, 10B are respectively positioned on the protrusions 17. The supporting faces 19, 41 of the attachment tabs 33, 35 are in contact with the faces 19 of the protrusions 17. The central portion 31 of each first half-shell 25 is directed towards the frame 5.

The anti-roll bar 5 is then positioned in the cradles formed by the central portions 31 of the first half-shells 25 of each of the bearings 10A, 10B.

Next, the second half-shells 27 are positioned on the first half-shells 25 as illustrated in FIG. 2. The central portions 31 of the second half-shells 27 are directed oppositely to the frame 5, so as, for each of the bearings 10A, 10B, the housing 23 has a circular section.

Finally, the attachment screws 29 are placed in the pierced holes 37 aligned with the attachment tabs 33, 35 of the first half-shell 25 and of the second half-shell 27, and are screwed into the protrusions 17.

The anti-roll bar 15 is then concealed in the housings 23 of the bearings 10A, 10B.

By means of the features described above, the cost of the bogie 1 is reduced. Indeed, the protrusions 17 are easy to machine, and the first half-shell 25 and the second half-shell 27 of each bearing 10A, 10B are simple to make.

Unlike the state of the art, the bearings 10A, 10B according to the invention do not comprise any machined curved portion in the frame 5 of the bogie 1.

Further, the optional feature according to which the second half-shell 27 is analogue with the first half-shell 25 gives the possibility of only producing a single type of half-shell for making the bearings 10A, 10B.

Further, the first attachment system 29A and the second attachment system 29B coincide, the attachment of the first half-shell 25 and of the second half-shell 27 is made jointly.

The invention claimed is:

1. A bearing for mounting an anti-roll bar on a frame of a bogie, the anti-roll bar extending along a transverse axis of the bogie and being mobile in rotation relatively to the frame around the axis, the bearing comprising:
    a first half-shell mechanically secured to the frame, and
    a second half-shell attached on the first half-shell using an attachment system,
    wherein the first half-shell and the second half-shell form a housing crossing through along the axis and receiving the anti-roll bar,
    wherein the first half-shell being distinct from the frame and attached on the frame using the attachment system, and
    wherein the attachment system is formed by attachment screws crossing the first half-shell and the second half-shell, said attachment screws being screwed into the frame.

2. The bearing according to claim 1, wherein the first half-shell and the second half-shell are structurally analogue with each other.

3. The bearing according to claim 1, wherein the first half-shell and the second half-shell are symmetrically positioned relatively to a middle plane of the bearing, the middle plane passing through the axis.

4. The bearing according to claim 1, wherein each of the first half-shell and the second half-shell comprises:
    a central portion forming a hemicylindrical cradle, and
    two attachment tabs located on either side of the central portion along a direction substantially perpendicular to the axis, each attachment tab including at least one pierced hole provided for the attachment system.

5. The bearing according to claim 4, wherein the attachment tabs of the first half-shell respectively include two supporting faces intended to respectively press on the two protrusions of the frame.

6. The bearing according to claim 4, wherein the attachment system is formed with two pairs of attachment screws, the pairs of attachment screws being respectively attached in the attachment tabs.

7. A bogie comprising:
    a frame,
    at least two bearings according to claim 1, and
    at least one anti-roll bar received in the housings formed by both bearings.

8. The bogie according to claim 7, wherein the frame includes at least four protrusions, each of the first half-shells being attached on two of the protrusions.

* * * * *